United States Patent [19]

Wagner

[11] Patent Number: 5,368,022
[45] Date of Patent: Nov. 29, 1994

[54] IN-LINE FIRST STAGE AIR PRESSURE REGULATOR FOR USE IN SCUBA DIVING

[76] Inventor: Paul M. Wagner, 6900 Curry Dr., The Colony, Tex. 75056

[21] Appl. No.: 26,837

[22] Filed: Mar. 5, 1993

[51] Int. Cl.⁵ .................. A62B 9/02; F16K 31/122
[52] U.S. Cl. ................. 128/205.24; 128/204.18; 137/505.25
[58] Field of Search ........... 128/205.24, 204.26, 128/204.18; 251/337; 137/908, 505.25

[56] References Cited

U.S. PATENT DOCUMENTS

| | | | |
|---|---|---|---|
| 3,017,881 | 1/1962 | Smith | 128/205.24 X |
| 3,890,999 | 6/1975 | Moskow | 137/505.25 |
| 4,004,603 | 1/1977 | Jones | 128/205.24 X |
| 4,098,290 | 7/1978 | Glenn | 137/604 |
| 4,181,139 | 1/1980 | Martini | 137/505.25 X |
| 5,038,774 | 8/1991 | Chabert | 128/205.24 |
| 5,135,023 | 8/1992 | Ross | 137/505.11 |
| 5,190,030 | 3/1993 | Semeia | 128/204.26 |
| 5,209,224 | 5/1993 | Nelepka | 128/204.18 |
| 5,233,976 | 8/1993 | Ferguson | 128/204.26 |

FOREIGN PATENT DOCUMENTS

| | | | |
|---|---|---|---|
| 1302581 | 7/1962 | France | 137/505.25 |
| 608359 | 9/1960 | Italy | 137/505.25 |

*Primary Examiner*—Edgar S. Burr
*Assistant Examiner*—Eric P. Raciti

[57] ABSTRACT

An in-line air pressure regulator for scuba diving is designed to augment an independent air supply system in the event of a failure of the primary pressure regulator. The in-line air pressure regulator comprises a small, encapsulated, spring-biased valve which is designed to reduce tank pressure to a level which is compatible with the spare, or backup, second stage regulator. In effect, it is a simplified auxiliary primary air pressure regulator.

1 Claim, 4 Drawing Sheets

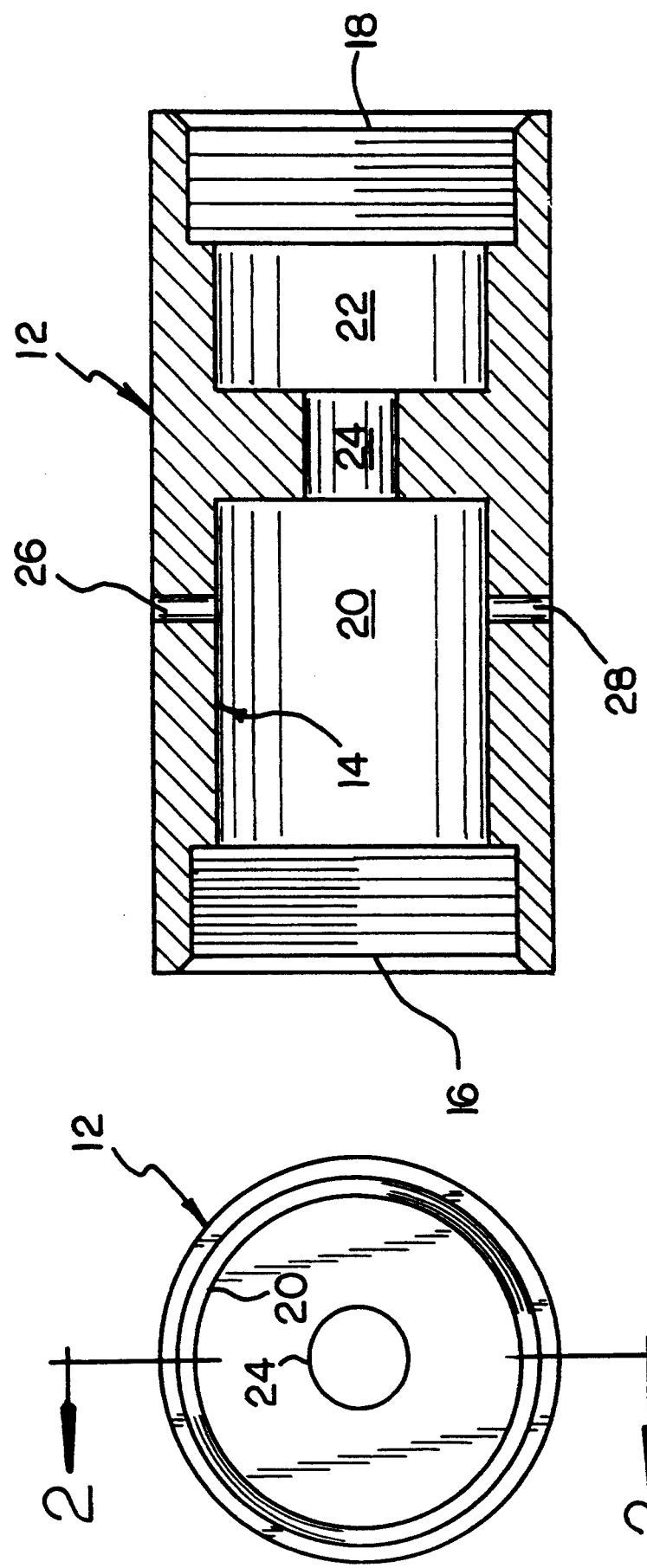

IN-LINE FIRST STAGE AIR PRESSURE REGULATOR FOR USE IN SCUBA DIVING

BACKGROUND OF THE INVENTION

1. Field of the Invention

The present invention relates to scuba diving apparatus, and more particularly pertains to an in-line air pressure regulator interposed between a tank of high pressure air and a second stage demand regulator.

2. Description of the Prior Art

The average recreational scuba diver must carry a tank filled with life sustaining air on his back while underwater. In order for this air to be breathable, it must be reduced from the very high pressure that is found in the tank to a much lower pressure that enables the breathing apparatus or second stage regulator to operate properly. With today's present technology, a large bulky and somewhat cumbersome regulator is attached to the scuba diver's tank in order to reduce this high pressure air from the tank to a much lower pressure at which the second stage or demand regulator can operate properly. The existing type of first stage regulator in common use today also has several optional ports providing both high and low air pressure for optional equipment used in diving. The addition of these optional ports increases the overall size of the first stage. It is a highly recommended practice when diving that the diver be equipped with a spare or alternate second stage air pressure regulator due to the dangers of equipment failure while underwater. It is common practice for most divers to be equipped with such a spare second stage regulator, but the spare regulator relies on the same first stage regulator to reduce the high pressure air to a lower pressure at which the second stage regulator can work as the diver's primary second stage regulator.

Therefore, if the diver's first stage regulator should fail, then both his primary and spare second stage regulators will be inoperative. There is available for purchase today a Y-type of tank valve that with the purchase of an additional first stage regulator gives the diver the option of having two air supplies completely independent of each other. But due to the large expense and the fact that the Y-valve is threaded into the diver's tank permanently, this is not a viable solution for a diver who travels and uses rented tanks. More specifically, this Y-valve connection cannot be easily removed from a diver's personal tank to be carried with him to another location where he must rent commercially available tanks.

As such, it can be appreciated that there exists a continuing need for new and improved auxiliary first stage air pressure regulators which can be utilized to backup an existing first stage air pressure regulator. In this regard, the present invention substantially fulfills this need by providing a first stage regulator that utilizes present technology but gives the diver two completely independent of each other air supplies with the use of a standard tank supply valve. The diver is also given the convenience of using rented tanks which then have two independent air supplies.

SUMMARY OF THE INVENTION

In view of the foregoing disadvantages inherent in the known types of first stage air pressure regulators now present in the prior art, the present invention provides an improved first stage air pressure regulator construction wherein the same can be used as an auxiliary first stage air pressure regulator by being attached to a high pressure air port forming a part of an existing first stage air pressure regulator. As such, the general purpose of the present invention, which will be described subsequently in greater detail, is to provide a new and improved auxiliary first stage air pressure regulator which has all the advantages of the prior art first stage air pressure regulators and none of the disadvantages To attain this, the present invention essentially comprises a first stage air pressure regulator that is small and compact enough so that it can be attached at one end to a high pressure line that comes from a high pressure port found on all standard first stage air pressure air regulators, with the other end being attached to an air supply conduit that leads to the diver's spare second stage demand regulator. As such, the diver is given the convenience of two completely independent of each other air supplies to use in case of a primary regulator failure. Since the valve comprising the present invention is attached at one end to an air supply conduit that goes to a high pressure port on the primary first stage regulator with its other end being attached to a conduit that goes to a diver's spare second stage regulator, the present invention can be used on any tank with a standard air valve.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved auxiliary first stage air pressure regulator which has all the advantages of the prior art auxiliary first stage air pressure regulators and none of the disadvantages.

It is another object of the present invention to provide a new and improved auxiliary first stage air pressure regulator which may be easily and efficiently manufactured and marketed.

It is a further object of the present invention to provide a new and improved auxiliary first stage air pressure regulator which is of a durable and reliable construction.

An even further object of the present invention is to provide a new and improved auxiliary first stage air pressure regulator which is susceptible of a low cost of manufacture with regard to both materials and labor, and which accordingly is then susceptible of low prices of sale to the consuming public, thereby making such auxiliary first stage air pressure regulators economically available to the buying public.

Still yet another object of the present invention is to provide a new and improved auxiliary first stage air pressure regulator which provides in the apparatuses and methods of the prior art some of the advantages thereof, while simultaneously overcoming some of the disadvantages normally associated therewith.

Still another object of the present invention is to provide a new and improved auxiliary first stage air pressure regulator which can be attached in-line to an existing auxiliary second stage or demand air pressure regulator, thereby to provide two independent air supplies to a diver from a high pressure air supply tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an end elevation view of the housing forming a part of the present invention.

FIG. 2 is a cross-sectional view of the housing taken along the line 2—2 in FIG. 1.

DESCRIPTION OF THE PREFERRED EMBODIMENT

Figure 5:
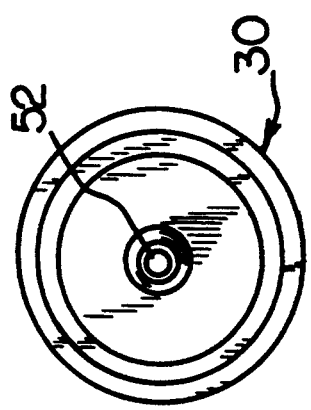
FIG. 5 is a right end elevation view of the piston.

With reference now to the drawings, and in particular to FIGS. 1-12 thereof, a new and improved auxiliary first stage air pressure regulator embodying the principles and concepts of the present invention and generally designated by the reference numeral 10 will be described.

More particularly, the in-line first stage air pressure regulator 10 includes a housing 12 which is of a cylindrical construction and which is provided with a through-extending bore 14. The housing 12 is appropriately threaded at opposed ends 16, 18, and is provided with a pair of aligned internal cylindrical chambers 20, 22 interconnected by an axially-aligned bore 24. A pair of pressure balancing 26, 28 are orthogonally directed through the sidewalls of the housing 12 so as to provide fluid communication between the ambient atmosphere and the first cylindrical chamber 20. The axial alignment of the first chamber 20, the second chamber 22, and the interconnection bore 24 provide for a fluid communication between the opposed threaded ends 16, 18 of the housing 12.

Figures 11, 12:
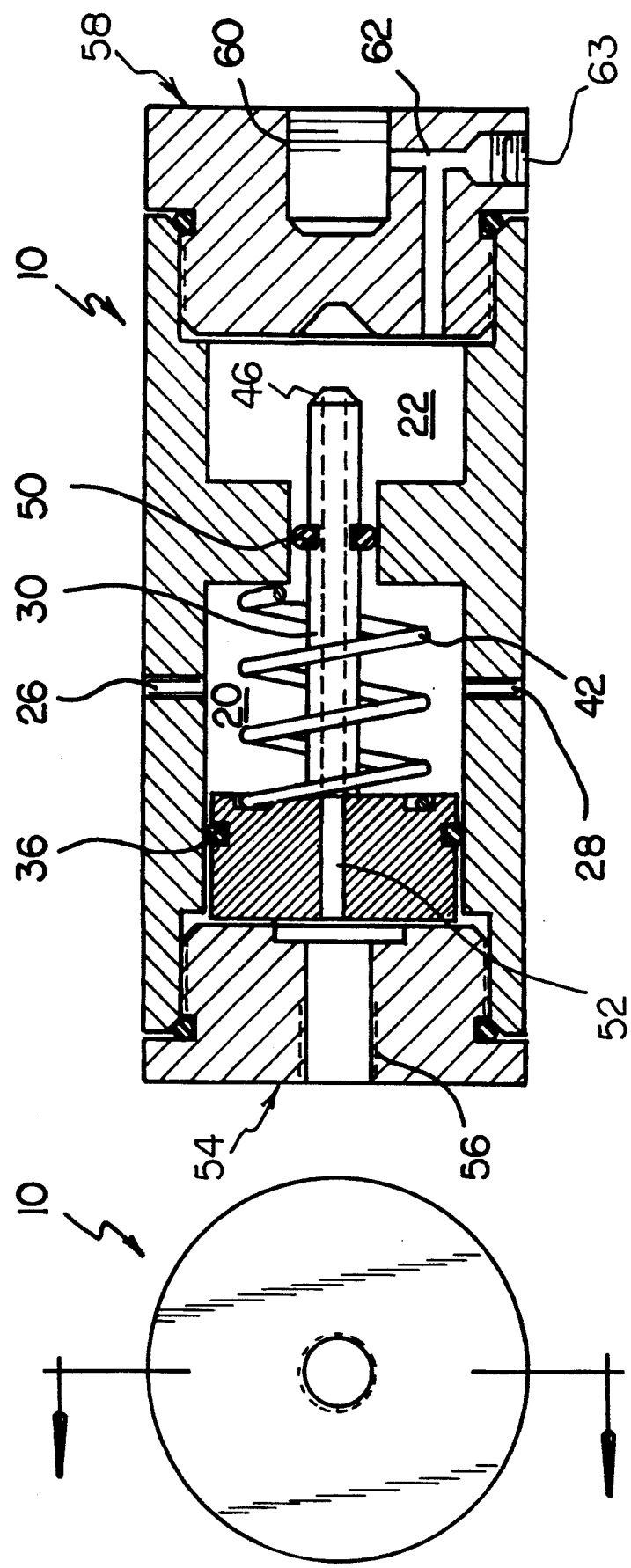
FIG. 11 is an end elevation view of the assembled auxiliary first stage air pressure regulator forming the present invention.
FIG. 12 is a cross-sectional view of the auxiliary first stage air pressure regulator as taken along the line 12—12 in FIG. 11.

FIGS. 3, 4, 5 and 12 illustrate a piston 30 which is positionable within the housing 12 for a purpose yet to be described. The piston 30 includes an enlarged cylindrically shaped piston head 32 having a circumferentially extending groove 34 for receiving a sealing o-ring 36. An internal face 38 of the piston head 32 includes a circular groove 40 designed to capture and retain the end of a compression spring 42 as best illustrated in FIG. 12.

The piston 30 further includes an integral elongated shaft 44 attached to the piston head 32 having a beveled end 46 and a further circumferentially extending groove 48 for holding a sealing o-ring 50. The piston 30 also includes an axially aligned, through-extending metering orifice 52. The metering orifice 52 is shown on an enlarged scale in FIG. 4; however, it is envisioned that the orifice will be of such a size as to substantially restrict air flow therethrough.

Figure 7:
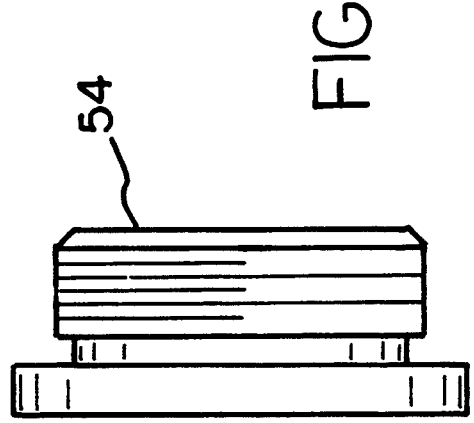
FIG. 7 is a side elevation view of the low pressure end cap.
Figure 6:
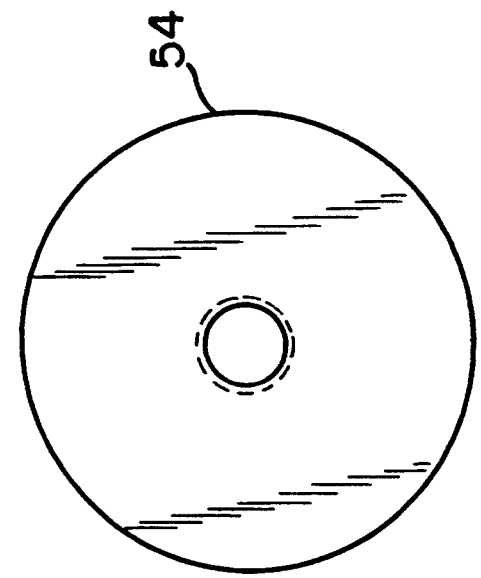
FIG. 6 is an end elevation view of a low pressure end cap forming a part of the present invention.
Figure 9:
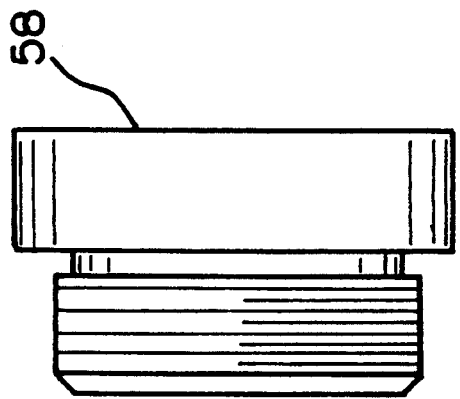
FIG. 9 is a side elevation view of the high pressure end cap.

As shown in FIGS. 6, 7 and 12, one end of the housing 12 is threadably or otherwise closed by a removable low pressure end cap 54. The low pressure end cap 54 includes a through-extending orifice 56 which allows fluid communication with the first air chamber 20, thereby to provide for a continuous air flow path through the air regulator 10.

FIGS. 8, 9 10 and 12 illustrate a high pressure end cap 58 which is used to seal the opposed end of the housing 12, with this cap having a through-extending, L-shaped orifice 60 so as to provide fluid communication with the second air chamber 22. Additionally, a bleed orifice 62 is provided in the high pressure end cap 58, wherein this bleed orifice can be used to selectively provide air supplies to other devices commonly used in scuba diving. Normally however, the orifice 62 would be closed with a plug 63.

Figure 10:
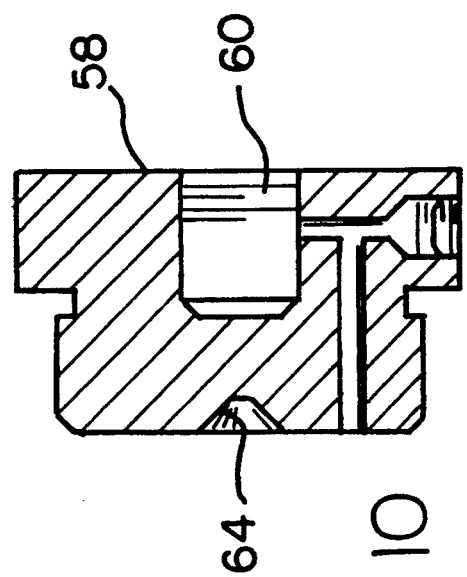
FIG. 10 is a cross-sectional view of the high pressure end cap as taken long the line 10—10 in FIG. 8.
Figure 8:
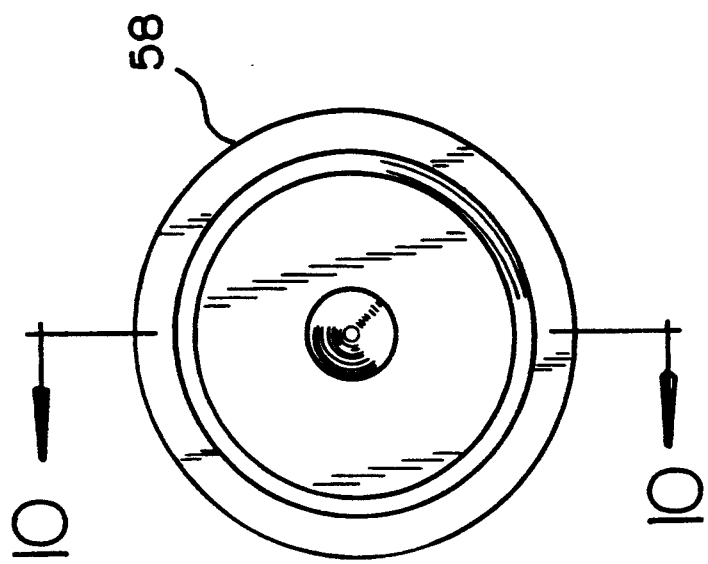
FIG. 8 is an end elevation view of a high pressure end cap forming a part of the present invention.

With particular reference to FIGS. 10 and 12 of the drawings, it will be noted that one end of the high pressure end cap 58 is also provided with a beveled section 64 with this beveled end functioning as a valve seat and being engageable with the beveled end 46 of the piston 30.

Figure 4:
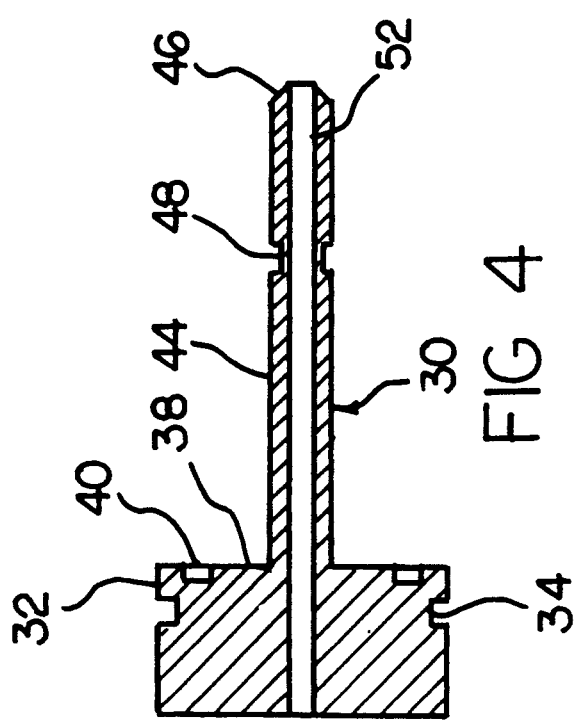
FIG. 4 is a cross-sectional view of the piston as taken along the line 4—4 in FIG. 3.
Figure 3:
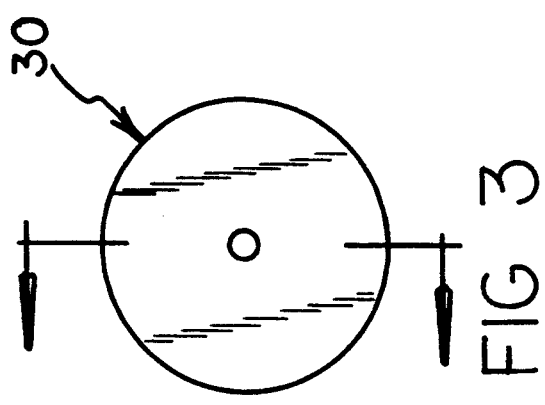
FIG. 3 is a left end elevation view of a piston forming a part of the present invention.

In operation, a user need only to attach a conduit from the existing first stage air pressure regulator on a scuba tank to the orifice 60 associated with the high pressure end cap 58. A flexible conduit to a second auxiliary second stage air pressure regulator is then threadably attached to the orifice 56 associated with the low pressure end cap 54. High pressure air delivered through the orifice 60 travels to the secondary air chamber 22 and around the beveled end 46 of the piston 30. The air travels down the metering orifice 52 outwardly through the orifice 56 to the second stage regulator. This high pressure air additionally forces the piston 30 to move against the compression of the spring 42 whereby the beveled section 46 of the piston comes into engagement with the beveled section 64 formed in the high pressure cap 58. This movement of the piston 30 effectively causes a slight fluctuating on-and-off supplying of air through the metering orifice 52 in as much as the meeting of the beveled surfaces 46, 64 operates as a valve seat to control air flow. The face 33 of the piston 30, as best illustrated in FIG. 4, can be provided with a concavity or other hollowed out section to greatly increase the area against which the air pressure operates thereby to cause a more effective movement of the piston 30. While the piston face 33 is shown as flat in FIG. 4, it is to be understood that it can be beveled out partially or to any degree desired to increase the air contact surface. As shown, the air pressure regulator 10 comprising the present invention may be positioned in line between the existing first stage air pressure regulator, thereby to provide a desired safety backup function or alternatively, it can be utilized as a primary stage regulator in and of itself.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved air pressure regulator for use in scuba diving apparatus consisting of:

a hollow housing having a first end and a second opposed end;

said hollow housing having a through bore extending axially between said first end and said second end and having a transverse partition therein to divide the interior of said hollow housing into first and second chambers, respectively, adjacent said first and second ends, respectively, said through bore defining an axial opening through said partition, with at least one pressure balancing through said housing into communication with said first chamber;

said housing further including a slidably movable piston sealably positioned in said first chamber movable in response to high pressure air supplied to said first chamber, a spring positioned in said first chamber between said piston and said partition to resiliently bias said piston toward said first end of said housing;

said piston further including a hollow metering tube having one end attached to said piston and having an opposed other free end sealably extending through said partition axial opening into said second chamber, said piston having an opening therein in communication with said one end of said hollow metering tube attached to said piston, and said other free end of said hollow metering tube being beveled to define a valve surface;

further including a first end cap sealingly attached to said first end of said housing proximal to said piston, said first end cap having an air supply feed port therein in communication with said opening in said piston and said first chamber, and a second end cap sealingly attached to said second end of said housing, said second end cap having a high pressure air-supply feed port therein in communication with said second chamber and said beveled free end of said hollow metering tube, said second end cap having an integrally formed inside surface confronting said beveled free end of said hollow metering tube and further having a recess therein axially aligned with said hollow metering tube, said recess being beveled so as to serve as a valve seat when said piston is caused to move against the resilient bias of said spring thereby bringing said beveled end of said hollow metering tube into contacting engagement with the surface of said beveled recess such that flow of air through said hollow metering tube from said second chamber to said first chamber is shut off.

* * * * *